United States Patent
Verma et al.

(10) Patent No.: US 9,201,733 B2
(45) Date of Patent: Dec. 1, 2015

(54) SYSTEMS AND METHODS FOR DATA REPAIR

(71) Applicant: FutureWei Technologies, Inc., Plano, TX (US)

(72) Inventors: Ajit Verma, Los Altos, CA (US); James Hughes, Palo Alto, CA (US); Xian Liu, Sunnyvale, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 192 days.

(21) Appl. No.: 13/800,213

(22) Filed: Mar. 13, 2013

(65) Prior Publication Data

US 2014/0281784 A1 Sep. 18, 2014

(51) Int. Cl.
*G06F 11/10* (2006.01)

(52) U.S. Cl.
CPC ........ *G06F 11/1092* (2013.01); *G06F 11/1084* (2013.01); *G06F 2211/1028* (2013.01)

(58) Field of Classification Search
CPC ............ G06F 11/1092; G06F 11/1084; G06F 2211/1028
USPC .......................... 714/752, 770, 769; 711/114
See application file for complete search history.

(56) References Cited

U.S. PATENT DOCUMENTS

2012/0166487 A1 * 6/2012 Stougie et al. ................ 707/792

* cited by examiner

*Primary Examiner* — Guy Lamarre
(74) *Attorney, Agent, or Firm* — Slater & Matsil, L.L.P.

(57) ABSTRACT

An embodiment method for data repair in a storage system includes determining, by a processor, a minimum number of missing data blocks needed to repair a corrupted object in a first portion of the storage system, wherein the missing data blocks are not available in the first portion of the storage system, retrieving only the minimum number of missing data blocks needed to repair the corrupted object from a second portion of the storage system, and repairing the corrupted object in the first portion of the storage system using erasure codes and the retrieved minimum number of missing data blocks.

20 Claims, 3 Drawing Sheets

SYSTEMS AND METHODS FOR DATA REPAIR

TECHNICAL FIELD

The present invention relates generally to systems and methods for data repair, and, in particular embodiments, to systems and methods for data repair using erasure code in a multi-datacenter environment.

BACKGROUND

Generally, massive storage systems are used to store large quantities of objects in a network environment. These storage systems are typically designed to handle many billions of objects and tens to hundreds of petabytes of data. These storage systems may include multiple datacenters, storage pools, or storage clusters. As time passes and storage hardware degrades, the quality of the stored objects may degrade, and the objects may become corrupted. Due to their large size, massive storage systems may be particularly susceptible to data corruption. Additionally, many objects stored in the storage system may go unread (i.e., unaccessed) for extended periods of time leaving these unread objects susceptible to silent data corruption.

In order to combat data corruption, a storage system may store redundant copies of an object in the same and/or redundant datacenters. When the storage system detects a corrupted object, it may repair the object by, for example, replacing the corrupted object with an uncorrupted copy or using erasure codes.

SUMMARY OF THE INVENTION

These and other problems are generally solved or circumvented, and technical advantages are generally achieved, by embodiments of the present invention, which provide a system and method for data repair in a storage system.

In accordance with an embodiment, a method for data repair in a storage system includes determining, by a processor, a minimum number of data blocks needed to repair a corrupted object in one portion of the storage system, wherein the missing data blocks are not available in the first portion of the storage system, retrieving the minimum number of missing data blocks needed to repair the corrupted object from another portion of the storage system, and repairing the object in the first portion of the storage system using erasure codes and the retrieved minimum number of missing data blocks.

In accordance with another embodiment, a method for data repair in a storage system includes determining, by a processor, a number of available data blocks in a group of data blocks needing repair and a number of available parity information blocks associated with the group of data blocks in a first portion of the storage system, comparing the number of available data blocks plus the number of available parity information blocks with a minimum number of blocks needed to repair the group of data blocks, determining a total number of data blocks needed to repair the group of data blocks, wherein the total number of missing data blocks is a difference between the minimum number of blocks and the number of available data blocks plus the number of available parity information blocks, retrieving the total number of missing data blocks from a remote portion of the storage system, wherein the remote portion of the storage system is separate from the first portion of the storage system, and repairing the group of data blocks in the first portion of the storage system using the retrieved total number of missing data blocks, the available data blocks, the available parity information blocks.

In accordance with yet another embodiment, a storage system includes a processor and a computer readable storage medium storing programming for execution by the processor, the programming including instructions to repair an object needing repairs in a first portion of the storage system, wherein the instructions to repair the object include further instructions to determine a number of missing data blocks required to repair the object needing repairs, retrieve only a subset of missing data blocks from a remote portion of the storage system, wherein the remote portion of the storage system is separate from the first portion of the storage system, and repair the object using erasure codes and the retrieved number of missing data blocks.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In storage systems, corrupted objects may be detected through foreground or background processes (e.g., reading and validating the objects). Attempting to read a corrupted object may result in an error, such as read error or parity/checksum/signature mismatch. Corrupted objects may also be detected through background processes (e.g., an object integrity service) that check data integrity in the system regularly.

When a corrupted object is found, the storage system may repair the object locally by using resources in the portion of the storage system (e.g., a datacenter) where the corrupted object is located. Typically, object repair is done either by replacing the corrupted object with an uncorrupted copy or through erasure codes, wherein the corrupted or missing piece of original object may be reconstructed from the uncorrupted/readable portions of the corrupted object and associated parity information.

An issue with this approach is that storage systems are often implemented using a storage structure, such as distributed hash tables (DHT), to store objects as data blocks distributed across the storage system. This distribution may be pseudo-random (i.e., mathematically generated), and an object's data blocks and associated parity information blocks may land on the same physical disk. When that physical disk fails, both the data and the parity blocks are lost, and local repairs may not be feasible. The risk to durability requirements of the storage system increases (i.e., the probability of losing an object's data blocks and associated parity information versus the data durability requirements of a system increases) with the size of the storage system and may be quite high in large-scale storage systems.

Existing storage systems combat this type of data loss by replacing the missing or corrupted object with an uncorrupted copy from another portion of the storage system, such as another datacenter. However, this approach may consume a large amount of system resources (e.g., bandwidth used to transmit the data from the other datacenter) and may be time intensive, negatively affecting a client's access to the object.

Various embodiments are described with respect to a specific context, namely an object storage system that uses a distributed hash table (DHT) storage cluster. The invention may also be applied, however, to other storage systems and may use other types of storage structures such as column store, a NoSQL database, and the like.

Figure 1:
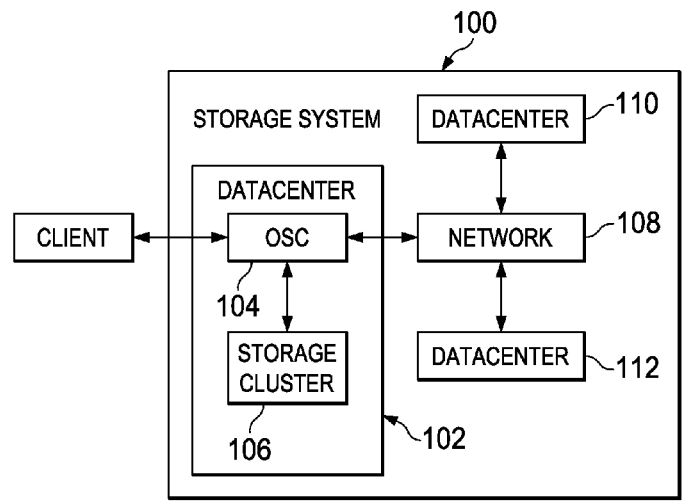
FIG. 1 is a block diagram of a storage system that may be used for implementing, for example, the devices and methods described herein, in accordance with an embodiment.

FIG. 1 illustrates a block diagram of a portion of a data storage system including storage system 100 according to an embodiment. Objects in storage system 100 may be stored in a distributed hash table (DHT), a column store, a NoSQL database, etc. that uses magnetic hard drives, solid state drives, or optical drives although other data structures for storing objects may be used. Clients may send objects for storage in storage system 100 as a stream of data over a network (not shown). An OSC (object storage controller) 104 receives these data streams and puts them into a storage cluster 106 in a particular part of storage system 100, for example, a datacenter 102. Storage cluster 106 may include storage nodes in a DHT implementation. OSC 104 generates a metadata record for each object to associate the data together with the object's name. This metadata record may also be stored in storage cluster 106. The client sends requests to storage system 100 to perform specific tasks (e.g., to get, put, or delete an object). OSC 104 decodes and authenticates a request, interacts with storage cluster 106 and other components to perform the desired task, and returns any results to the client. OSC 104 further implements erasure codes for fixing corrupted objects by reconstructing the corrupted object using the uncorrupted/readable portions of the corrupted object and associated parity information. Although FIG. 1 only shows one instance of OSC 104 in datacenter 102, datacenter 102 may include multiple instances of OSC 104 that may concurrently perform the same types of tasks.

Storage system 100 includes multiple different parts (e.g., additional datacenters 110 and 112) interconnected by a network 108. Datacenters 110 and 112 may be geographically isolated from each other and datacenter 102. Network 108 may be the same or a different network as the network used by the client to communicate with storage system 100. Datacenters 110 and 112 each includes a separate storage cluster, which may store the same, redundant, or different data as the data stored in storage cluster 106. Further, each datacenter 102, 110, and 112 may include one or more OSCs that operate in a similar manner as OSC 104. While FIG. 1 only illustrates three distinct datacenters for storage system 100, various embodiments may be applied to storage systems having more or fewer datacenters.

When an OSC, such as OSC 104, receives a new object from a client, it stores the object in a storage cluster, such as storage cluster 106, as smaller groups of data blocks of a predetermined size. For example, in storage system 100, objects may be stored as groups of twelve, 1 MB data blocks (i.e., a 1 GB object will be stored as eighty-four groups of twelve 1 MB blocks of data). The size of the data blocks and groups of data blocks may vary from one storage system to the next. Each data block may have a unique identification reference. These identification references and associated group information may be stored in the object's metadata record in storage system 100.

OSC 104 also generates parity information blocks (also referred to as parity blocks) for each group of data blocks so that, in case any data becomes corrupted or lost, it may be recovered using erasure codes. The parity information blocks may be generated using, for example logic functions (XOR) and/or polynomial mathematics. Continuing with the numbers from above, storage system 100 may be configured to generate three blocks of parity information for each group of data blocks. Therefore, each group of data has fifteen 1 MB data blocks associated with the group (i.e., the twelve blocks of data plus the three blocks of associated parity information). This group of fifteen 1 MB data blocks may be referred to collectively as an erasure group.

The erasure codes implemented by storage system 100 may be able to reconstruct a group of data blocks from any twelve of the fifteen blocks associated with the group. That is, the erasure codes are capable of generating up to three corrupted or missing data blocks or parity information blocks from remaining uncorrupted data blocks and associated parity information. Generally, the number of missing data blocks a storage system may generate using erasure codes is directly related to the number of parity information blocks in an erasure group. If more than three data blocks in a group are corrupted or missing, then local repairs are not possible, and some data must be retrieved from remote datacenters (e.g., datacenter 110 and/or 112). The numbers given in this section are for illustration purposes only; various embodiments may be applied to storage systems generating a different number of parity information blocks per group and implementing different erasure code schemes. For example, in an alternative embodiment, the storage system may generate six parity information blocks for a group of eighteen data blocks; therefore, that storage system may be able to reconstruct any eighteen out of the twenty-four blocks in an erasure group. The specific mechanics behind generating parity information recovering data from erasure codes is well known in the art and not discussed in detail herein.

In an embodiment, storage system 100 retrieves the minimum number of missing data blocks from a separate portion of the storage system (e.g., a separate datacenter or multiple separate datacenters) required to implement erasure codes locally. Continuing with the above numbers, a group of data blocks may be repaired locally (e.g., at datacenter 102) if there are at least twelve uncorrupted data blocks out of the fifteen total blocks associated with the group. However, if fewer than twelve blocks associated with the group are uncorrupted, OSC 104 may pull the minimum number of missing data blocks necessary to implement erasure codes from a copy of the object in another datacenter (e.g., datacenter 110 or 112) over network 108.

For example, assume four data blocks in an erasure group are corrupted and the remaining eight data blocks and three blocks of associated parity information are available. OSC 104 pulls one missing data block from a copy of the group of data blocks located at datacenter 110 over network 108 using, for example, a Range Get function. OSC 104 then implements erasure codes to reconstruct the remaining corrupted data blocks in the group locally at datacenter 102 and saves the repaired group to storage cluster 106.

In an alternative example, one data block in an erasure group is corrupted and all three blocks of associated parity information are corrupted. OSC 104 pulls the missing data block from a copy of the object at datacenter 110 over network 108. OSC 104 then reconstructs the three blocks of associated parity information for future use. Alternatively, if datacenter 110 does not have the necessary data block, OSC 104 pulls the requisite data block from datacenter 112.

In yet another example, three data blocks in an erasure group are corrupted and two blocks of associated parity information are corrupted (i.e., five total blocks of the fifteen blocks in the erasure group are corrupted). OSC 104 attempts to pull two missing data blocks from a copy of the object at data center 110 over network 108. However, OSC 104 may only find one data block at datacenter 110. OSC 104 then pulls the remaining data block from datacenter 112. OSC 104 then reconstructs the final corrupted data block locally using the two blocks OSC 104 pulled from datacenters 110 and 112. OSC 104 may also reconstruct the two missing blocks of associated parity information for future use.

In this manner, OSC 104 pulls the requisite number of missing data blocks to use erasure codes and repairs the corrupted object locally. If OSC 104 cannot pull the data blocks from a particular remote datacenter, OSC 104 may pull the data blocks from different datacenter. OSC 104 may also reconstruct any missing parity information blocks for the group for future use. If the requisite data cannot be found, OSC 104 may notify the client that repairs were unsuccessful and direct the client to a different datacenter to access the file. The numbers used in the above examples are purely illustrative. The particular number of data blocks and associated parity information needed for various embodiments may vary depending on the individual storage system.

Figure 2A:
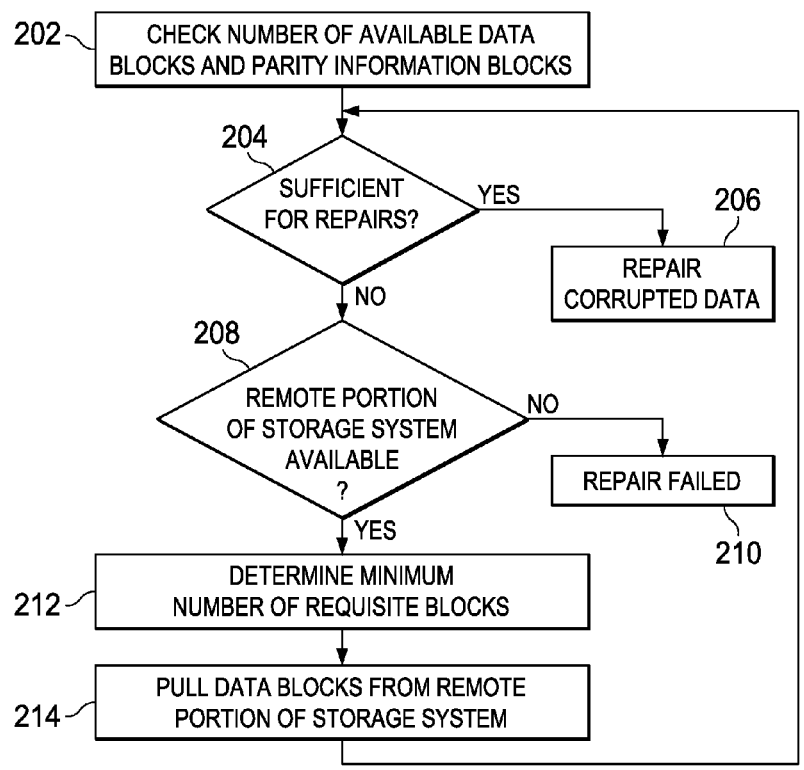
FIGS. 2A and 2B are flow diagrams of a data repair service in accordance with an embodiment.
Figure 2B:
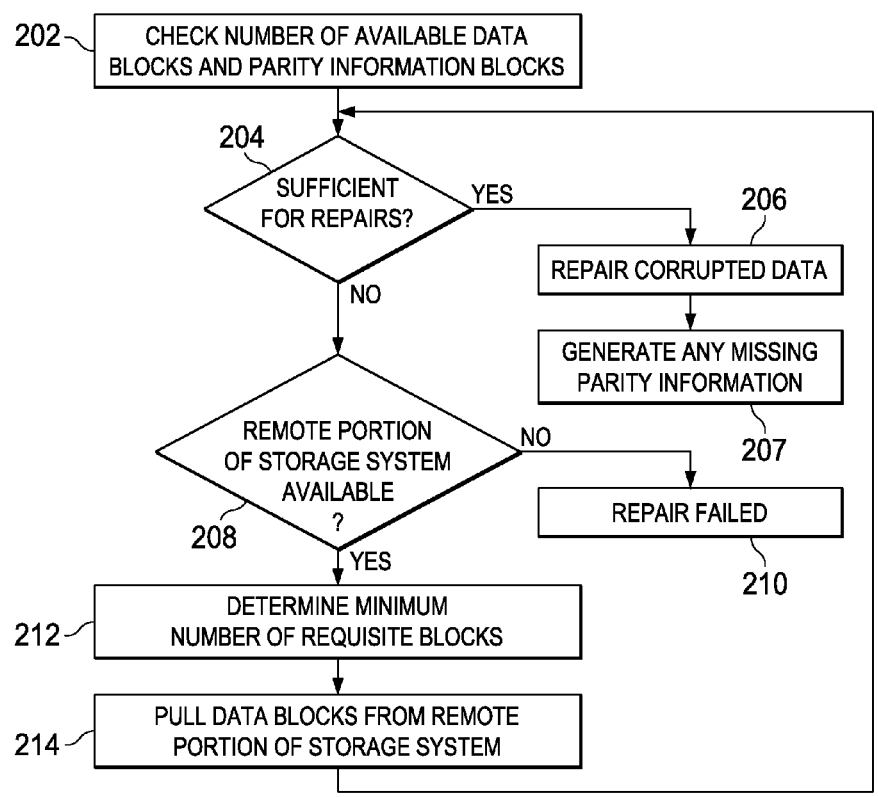

FIGS. 2A and 2B illustrate flow charts detailing a data repair service according to various embodiments. In step 202, an OSC, such as OSC 104, checks the number of available (i.e., uncorrupted/readable blocks) data blocks and associated parity information blocks in a corrupted group of data blocks needing repairs. In step 204, the OSC determines if the number of available blocks is sufficient to repair the corrupted group. If the number of available blocks is sufficient, in step 206, OSC 104 repairs the group of data blocks using erasure codes and writes the group of data blocks into a storage cluster for access by a client.

If the OSC determines there are not enough available data blocks to repair the group, then in step 208, the OSC determines if there are remote portions, for example another data center, of the storage system available to look for the necessary data blocks. If there are no other portions of the storage system available, then in step 210, the OSC notifies the client that repairs have failed. The OSC may redirect the client to another data center or storage system to access the object. Alternatively, if this repair method fails, the OSC may repair the object using existing methods as is known in the art, for example, by copying an uncorrupted copy of the entire object from another datacenter.

However, if there are remote portions of the storage system available, in step 212, the OSC determines the minimum number of missing data blocks needed to repair the group. For example, if twelve total blocks are needed and only eight data blocks and two blocks of associated parity information are available, the OSC would determine that a minimum of two missing data blocks are needed to successfully repair the group.

In step 214, the OSC attempts to pull the minimum number of data blocks from the remote portion of the storage system. The OSC may do this using, for example, a Range Get command. The OSC then returns to step 204, where it determines if it now has the requisite number of data blocks needed to repair the group. If yes, then in step 266, the OSC repairs the group using erasure codes and writes the repaired object into the storage cluster. If not, in step 208, the OSC checks to see if there is another available remote portion of the storage system (e.g., yet another separate datacenter). If not, in step 210, the repairs fail and the OSC notifies the client of the failed repair.

If yes, the OSC determines the minimum number of requisite blocks it now needs to repair the data. Continuing with the example from above, if the OSC was only able to pull one data block from the first remote portion of the storage system, the OSC would determine that it now needs one more data block for successful repairs. In an iterative process, the OSC searches all the portions of a storage system to pull the minimum number of data blocks needed to repair the corrupted data. If pulling the minimum blocks of data is successful, the OSC repairs the corrupted data locally using erasure codes. An alternative embodiment, shown in FIG. 2B, adds step 207 where the OSC may generate any missing parity information blocks associated with the group of data blocks after it successfully repairs the object.

By retrieving the minimum number of data blocks necessary to repair an object locally, various embodiments generate savings in network resources. For example, retrieving a 1 MB data block consumes significantly less bandwidth than copying an entire 1 GB object. Further, various embodiments allow for faster repair times of corrupted objects as a result of transferring less data.

Figure 3:
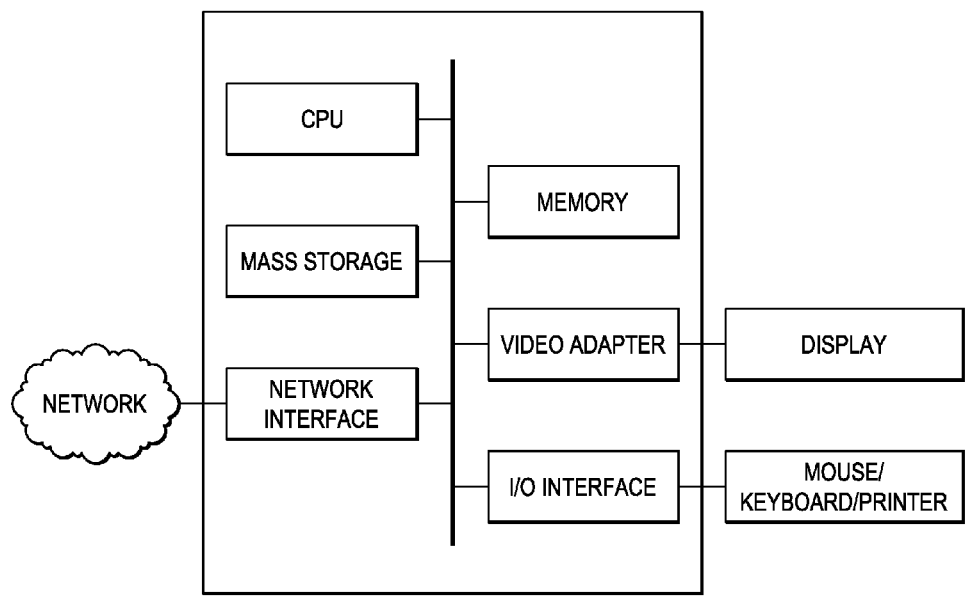
FIG. 3 is a block diagram illustrating a computing platform that may be used for implementing, for example, the devices and methods described herein, in accordance with an embodiment.

FIG. 3 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for data repair in a storage system comprising:
    determining, by a processor, a minimum number of missing data blocks needed to repair a corrupted object in a first portion of the storage system using erasure codes, wherein the missing data blocks are not available in the first portion of the storage system;
    retrieving only the minimum number of missing data blocks needed to repair the corrupted object from an uncorrupted copy of the corrupted object stored in a second portion of the storage system; and
    repairing the corrupted object in the first portion of the storage system using erasure codes and the retrieved minimum number of missing data blocks.

2. The method of claim 1, further comprising, after repairing the corrupted object:
    determining a number of missing parity information blocks associated with the repaired corrupted object; and
    generating the number of missing parity information blocks associated with the repaired corrupted object.

3. The method of claim 1, wherein the first portion of the storage system is a first datacenter and the second portion of the storage system is a second datacenter.

4. The method of claim 1, wherein retrieving the minimum number of missing data blocks comprises pulling the minimum number of missing data blocks from the second portion of the storage system over a network.

5. The method of claim 1, further comprising:
    storing objects in the storage system as a plurality of groups of identically-sized data blocks, wherein the corrupted object is one of the stored objects in the storage system; and
    generating a number of parity information blocks associated with each group of identically-sized data blocks.

6. The method of claim 5, wherein determining the minimum number of missing data blocks needed to repair the corrupted object further comprises:
    determining a number of available data blocks in a group of data blocks needing repair, wherein the group of data blocks is one of the plurality of groups of identically sized data blocks of the corrupted object;
    determining a number of available parity information blocks associated with the group of data blocks; and
    determining the minimum number of missing data blocks, wherein the minimum number of missing data blocks is a difference between a minimum number of data blocks required to repair the group of data blocks and the number of available data blocks plus the number of available parity information blocks.

7. The method of claim 6, wherein the minimum number of data blocks required to repair the group of data blocks corresponds to the number of parity information blocks associated with each group of data blocks.

8. The method of claim 5, wherein storing the objects comprises storing the objects as a plurality of groups of twelve one-megabyte data blocks, and wherein generating the number of parity information blocks comprises generating three parity information blocks associated with each group of twelve one-megabyte data blocks.

9. The method of claim 5, wherein storing the objects further comprises storing the objects in a distributed hash table (DHT) implementation.

10. A method for data repair in a storage system comprising:
    determining, by a processor, a number of available data blocks in a group of data blocks needing repair in a first portion of the storage system, wherein the number of available data blocks is greater than zero;
    determining a number of available parity information blocks associated with the group of data blocks in the first portion of the storage system;
    comparing the number of available data blocks plus the number of available parity information blocks with a minimum number of blocks needed to repair the group of data blocks using erasure codes;
    determining a total number of missing data blocks needed to repair the group of data blocks, wherein the total number of missing data blocks is a difference between the minimum number of blocks and the number of available data blocks plus the number of available parity information blocks;
    retrieving the total number of missing data blocks from a copy of the group of data blocks stored in a remote portion of the storage system, wherein the remote portion of the storage system is separate from the first portion of the storage system; and
    repairing the group of data blocks in the first portion of the storage system using the retrieved total number of missing data blocks, the available data blocks in the first portion of the storage system, and the available parity information blocks in the first portion of the storage system.

11. The method of claim 10, further comprising, after repairing the group of data blocks, generating a number of missing parity information blocks when the number of available parity information blocks is less than a number of parity information blocks generated by the storage system, for each group of data blocks, wherein the number of missing parity information blocks is a difference between the number of parity information blocks generated by the storage system, and the number of available parity information blocks.

12. The method of claim 11, wherein the minimum number of blocks needed to repair the group of data blocks corresponds with the number of parity information blocks generated, by the storage system, for each group of data blocks.

13. The method of claim 10, wherein the remote portion of the storage system is a combination of multiple remote portions of the storage system.

14. The method of claim 13, wherein retrieving the total number of missing data blocks comprises:
    retrieving a first number of missing data blocks from a first remote portion of the storage system;

comparing the first number of missing data blocks with the total number of missing data blocks; and retrieving a second number of missing data blocks from a second remote portion of the storage system when the first number of missing data blocks is less than the total number of missing data blocks, wherein the second number of missing data blocks is equal to a difference between the total number of missing data blocks and the first number of missing data blocks.

15. The method of claim 14, wherein the first portion of the storage system and the first and the second remote portions of the storage system are a first, second, and third datacenter respectively.

16. A storage system comprising:
a processor; and
a computer readable storage medium storing programming for execution by the processor, the programming including instructions to repair an object needing repairs in a first portion of the storage system, wherein the instructions to repair the object include further instructions to:
determine a number of missing data blocks required to repair the object needing repairs using erasure codes;
retrieve only the number of missing data blocks from a copy of the object stored on a remote portion of the storage system, wherein the remote portion of the storage system is separate from the first portion of the storage system; and
repair the object using erasure codes and the retrieved number of missing data blocks.

17. The storage system of claim 16, wherein the programming includes further instructions to:
store the object as a plurality of identically sized groups of data blocks in the first portion of the storage system;
generate a number of parity information blocks for each of the plurality of identically sized groups of data blocks; and
store the number of parity information blocks in the first portion of the storage system.

18. The storage system of claim 16, wherein the instructions to repair the object needing repairs include further instructions to, after the instructions to repair the object, generate a number of missing parity information blocks associated with the object.

19. The storage system of claim 16, wherein the first portion of the storage system is a first datacenter, wherein the remote portion of the storage system includes a plurality of other datacenters different than the first datacenter.

20. The storage system of claim 16, wherein the instructions to retrieve the number of missing data blocks include further instructions to pull the number of missing data blocks from the remote portion of the storage system over a network.

* * * * *